(12) United States Patent
Chiba et al.

(10) Patent No.: US 10,123,242 B2
(45) Date of Patent: Nov. 6, 2018

(54) METHOD, APPARATUS AND SYSTEM FOR DUAL CONNECTIVITY HANDOVER

(71) Applicant: Nokia Solutions and Networks Oy, Espoo (FI)

(72) Inventors: Tsunehiko Chiba, Saitama (JP); Yang Liu, Beijing (CN); Yan Ji Zhang, Beijing (CN); Benoist Pierre Sebire, Tokyo (JP); Guillaume Decarreau, Munich (DE); Srinivasan Selvaganapathy, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/547,115

(22) PCT Filed: Jan. 12, 2016

(86) PCT No.: PCT/EP2016/050419
§ 371 (c)(1),
(2) Date: Jul. 28, 2017

(87) PCT Pub. No.: WO2016/120052
PCT Pub. Date: Aug. 4, 2016

(65) Prior Publication Data
US 2018/0014229 A1  Jan. 11, 2018

(30) Foreign Application Priority Data
Jan. 30, 2015  (IN) .............................. 451/CHE/2015

(51) Int. Cl.
*H04W 36/00* (2009.01)
*H04W 76/15* (2018.01)
(Continued)

(52) U.S. Cl.
CPC ....... *H04W 36/0066* (2013.01); *H04W 36/08* (2013.01); *H04W 36/38* (2013.01); *H04W 76/025* (2013.01); *H04W 76/15* (2018.02)

(58) Field of Classification Search
CPC ... H04W 36/08; H04W 36/385; H04W 36/02; H04W 36/0083; H04W 76/02;
(Continued)

(56) References Cited

U.S. PATENT DOCUMENTS

2011/0249651 A1* 10/2011 Kang ................ H04W 36/0033
370/331

FOREIGN PATENT DOCUMENTS

EP        2 375 813 A1     10/2011
JP   WO-2011083763 A1      7/2011
(Continued)

OTHER PUBLICATIONS

3GPP TSG-RAN WG3 Meeting #83, Prague, Czech Republic, Feb. 10-14, 2014, R3-140117, "MeNB Mobility Procedure", Huawei, 5 pgs.
(Continued)

*Primary Examiner* — Nizar Sivji
(74) *Attorney, Agent, or Firm* — Harrington & Smith

(57) ABSTRACT

There is provided a method including receiving, at a secondary cell, mapping information from a primary cell and using the mapping information to associate a connection request with a user equipment associated with the secondary cell.

10 Claims, 14 Drawing Sheets

(51) Int. Cl.
*H04W 36/38* (2009.01)
*H04W 76/02* (2009.01)
*H04W 36/08* (2009.01)

(58) Field of Classification Search
CPC ............. H04W 76/022; H04W 84/045; H04W 36/0016; H04W 36/00
See application file for complete search history.

(56) References Cited

FOREIGN PATENT DOCUMENTS

| WO | WO-2015017968 A1 | 2/2015 |
| WO | WO 2015/143578 A1 | 10/2015 |
| WO | WO 2016/006969 A1 | 1/2016 |

OTHER PUBLICATIONS

3GPP TS 36.300 V12.4.0 (Dec. 2014), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 251 pgs.
3GPP TSG RAN Meeting #65, Edinburgh, Scotland, Sep. 9-12, 2014, RP-141266, "Revised Work Item Description: Dual Connectivity for LTE", NTT DOCOMO, Inc., NEC Corporation, 8 pgs.
3GPP TSG-RAN Meeting #83, Prague, Czech Republic, Feb. 10-14, 2014, R3-140346, "Dual Connectivity—mobility scenarios", Ericsson, 7 pgs.

\* cited by examiner

Figure 6c

R1: Providing, to a target primary cell, mapping information as part of a handover procedure to the target cell

METHOD, APPARATUS AND SYSTEM FOR DUAL CONNECTIVITY HANDOVER

BACKGROUND

The present application relates to a method, apparatus and system and in particular but not exclusively, dual connectivity.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases.

SUMMARY

In a first aspect, there is provided a method comprising receiving, at a secondary cell, mapping information from a primary cell and using the mapping information to associate a connection request with a user equipment associated with the secondary cell.

Said mapping information may comprise user equipment identity information.

Said user equipment identity information may comprise at least one of—E-UTRAN cell global identifier, cell radio network temporary identifier, application protocol identity and physical cell identity.

The connection request may be part of a handover procedure to the primary cell from a source primary cell.

The method may comprise receiving said mapping information in one of a secondary node addition request message and a secondary node modification request message.

The method may comprise performing said method at a base station which controls the secondary cell.

In a second aspect, there is provided a method comprising receiving, from a source primary cell, mapping information as part of a handover procedure from the source primary cell and providing said mapping information to a secondary cell for use in associating a connection request with a user equipment associated with the secondary cell.

Said mapping information may comprise user equipment identity information.

Said user equipment identity information may comprise at least one of E-UTRAN cell global identifier, cell radio network temporary identifier, application protocol identity, control plane address and physical cell identity.

The method may comprise providing application protocol identity to the secondary cell in dependence on a received control plane address.

The method may comprise providing said mapping information in one of a secondary node addition request message and a secondary node modification request message.

Receiving mapping information from a source primary cell may comprise receiving mapping information from a base station that controls the source primary cell.

The method may comprise performing said method at a base station which controls a primary cell.

Providing said mapping information to a secondary cell may comprise providing said mapping information to a base station which controls the secondary cell.

In a third aspect, there is provided a method comprising providing, to a target primary cell, mapping information as part of a handover procedure to the target cell.

Said mapping information may comprise user equipment identity information for a user equipment associated with a secondary cell.

Said user equipment identity information may comprise at least one of E-UTRAN cell global identifier, cell radio network temporary identifier, application protocol identity, physical cell identity and control plane address.

The method may comprise performing said method at a base station which controls a primary cell.

Providing said mapping information to a target primary cell may comprise providing said mapping information to a base station which controls the target primary cell.

In a fourth aspect there is provided an apparatus, said apparatus comprise means for receiving, at a secondary cell, mapping information from a primary cell and means for using the mapping information to associate a connection request with a user equipment associated with the secondary cell.

Said mapping information may comprise user equipment identity information.

Said user equipment identity information may comprise at least one of—E-UTRAN cell global identifier, cell radio network temporary identifier, application protocol identity and physical cell identity.

The connection request may be part of a handover procedure to the primary cell from a source primary cell.

The apparatus may comprise means receiving said mapping information in one of a secondary node addition request message and a secondary node modification request message.

The apparatus may comprise means for performing said method at a base station which controls the secondary cell.

In a fifth aspect there is provided an apparatus, said apparatus comprising means for receiving, from a source primary cell, mapping information as part of a handover procedure from the source primary cell and means for providing said mapping information to a secondary cell for use in associating a connection request with a user equipment associated with the secondary cell.

Said mapping information may comprise user equipment identity information.

Said user equipment identity information may comprise at least one of E-UTRAN cell global identifier, cell radio network temporary identifier, application protocol identity, control plane address and physical cell identity.

The apparatus may comprise means for providing application protocol identity to the secondary cell in dependence on a received control plane address.

The apparatus may comprise means for providing said mapping information in one of a secondary node addition request message and a secondary node modification request message.

Means for receiving mapping information from a source primary cell may comprise means for receiving mapping information from a base station that controls the source primary cell.

The apparatus may comprise means for performing said method at a base station which controls a primary cell.

Means for providing said mapping information to a secondary cell may comprise means for providing said mapping information to a base station which controls the secondary cell.

In a sixth aspect there is provide an apparatus, said apparatus comprising means for providing, to a target primary cell, mapping information as part of a handover procedure to the target cell.

Said mapping information may comprise user equipment identity information for a user equipment associated with a secondary cell.

Said user equipment identity information may comprise at least one of E-UTRAN cell global identifier, cell radio network temporary identifier, application protocol identity, physical cell identity and control plane address.

The apparatus may comprise means for performing said method at a base station which controls a primary cell.

Means for providing said mapping information to a target primary cell may comprise means for providing said mapping information to a base station which controls the target primary cell.

In a seventh aspect, there is provided an apparatus, said apparatus comprising at least one processor and at least one memory including a computer program code, the at least one memory and the computer program code configured to, with the at least one processor, cause the apparatus at least to receive, at a secondary cell, mapping information from a primary cell and use the mapping information to associate a connection request with a user equipment associated with the secondary cell.

Said mapping information may comprise user equipment identity information.

Said user equipment identity information may comprise at least one of—E-UTRAN cell global identifier, cell radio network temporary identifier, application protocol identity and physical cell identity.

The connection request may be part of a handover procedure to the primary cell from a source primary cell.

The apparatus may be configured to receive said mapping information in one of a secondary node addition request message and a secondary node modification request message.

The apparatus may be configured to perform said method at a base station which controls the secondary cell.

In an eighth aspect there is provided an apparatus, said apparatus comprising at least one processor and at least one memory including a computer program code, the at least one memory and the computer program code configured to, with the at least one processor, cause the apparatus at least to receive, from a source primary cell, mapping information as part of a handover procedure from the source primary cell and provide said mapping information to a secondary cell for use in associating a connection request with a user equipment associated with the secondary cell.

Said mapping information may comprise user equipment identity information.

Said user equipment identity information may comprise at least one of E-UTRAN cell global identifier, cell radio network temporary identifier, application protocol identity, control plane address and physical cell identity.

The apparatus may be configured to provide application protocol identity to the secondary cell in dependence on a received control plane address.

The apparatus may configured to provide said mapping information in one of a secondary node addition request message and a secondary node modification request message.

The apparatus may be configured to receive mapping information from a base station that controls the source primary cell.

The apparatus may be configured to perform said method at a base station which controls a primary cell.

The apparatus may be configured to provide said mapping information to a base station which controls the secondary cell.

In a ninth aspect, there is provided an apparatus, said apparatus comprising at least one processor and at least one memory including a computer program code, the at least one memory and the computer program code configured to, with the at least one processor, cause the apparatus at least to provide, to a target primary cell, mapping information as part of a handover procedure to the target cell.

Said mapping information may comprise user equipment identity information for a user equipment associated with a secondary cell.

Said user equipment identity information may comprise at least one of E-UTRAN cell global identifier, cell radio network temporary identifier, application protocol identity, physical cell identity and control plane address.

The apparatus may be configured to perform said method at a base station which controls a primary cell.

The apparatus may be configured to provide said mapping information to a base station which controls the target primary cell.

In a tenth aspect there is provided a computer program embodied on a non-transitory computer-readable storage medium, the computer program comprising program code for controlling a process to execute a process, the process comprising: receiving, at a secondary cell, mapping information from a primary cell and using the mapping information to associate a connection request with a user equipment associated with the secondary cell.

Said mapping information may comprise user equipment identity information.

Said user equipment identity information may comprise at least one of—E-UTRAN cell global identifier, cell radio network temporary identifier, application protocol identity and physical cell identity.

The connection request may be part of a handover procedure to the primary cell from a source primary cell.

The process may comprise receiving said mapping information in one of a secondary node addition request message and a secondary node modification request message.

The process may comprise performing said method at a base station which controls the secondary cell.

In an eleventh aspect there is provided a computer program embodied on a non-transitory computer-readable storage medium, the computer program comprising program code for controlling a process to execute a process, the process comprising: receiving, from a source primary cell, mapping information as part of a handover procedure from the source primary cell and providing said mapping information to a secondary cell for use in associating a connection request with a user equipment associated with the secondary cell.

Said mapping information may comprise user equipment identity information.

Said user equipment identity information may comprise at least one of E-UTRAN cell global identifier, cell radio network temporary identifier, application protocol identity, control plane address and physical cell identity.

The process may comprise providing application protocol identity to the secondary cell in dependence on a received control plane address.

The process may comprise providing said mapping information in one of a secondary node addition request message and a secondary node modification request message.

Receiving mapping information from a source primary cell may comprise receiving mapping information from a base station that controls the source primary cell.

The process may comprise performing said method at a base station which controls a primary cell.

Providing said mapping information to a secondary cell may comprise providing said mapping information to a base station which controls the secondary cell.

In a twelfth aspect, there is provided a computer program embodied on a non-transitory computer-readable storage medium, the computer program comprising program code for controlling a process to execute a process, the process comprising: providing, to a target primary cell, mapping information as part of a handover procedure to the target cell.

Said mapping information may comprise user equipment identity information for a user equipment associated with a secondary cell.

Said user equipment identity information may comprise at least one of E-UTRAN cell global identifier, cell radio network temporary identifier, application protocol identity, physical cell identity and control plane address.

The process may comprise performing said method at a base station which controls a primary cell.

Providing said mapping information to a target primary cell may comprise providing said mapping information to a base station which controls the target primary cell.

In a thirteenth aspect there is provided a computer program product for a computer, comprising software code portions for performing the steps of any one of the first, second and third aspects when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 6c shows a flowchart of an example method of a mapping mechanism in MeNB handover;

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
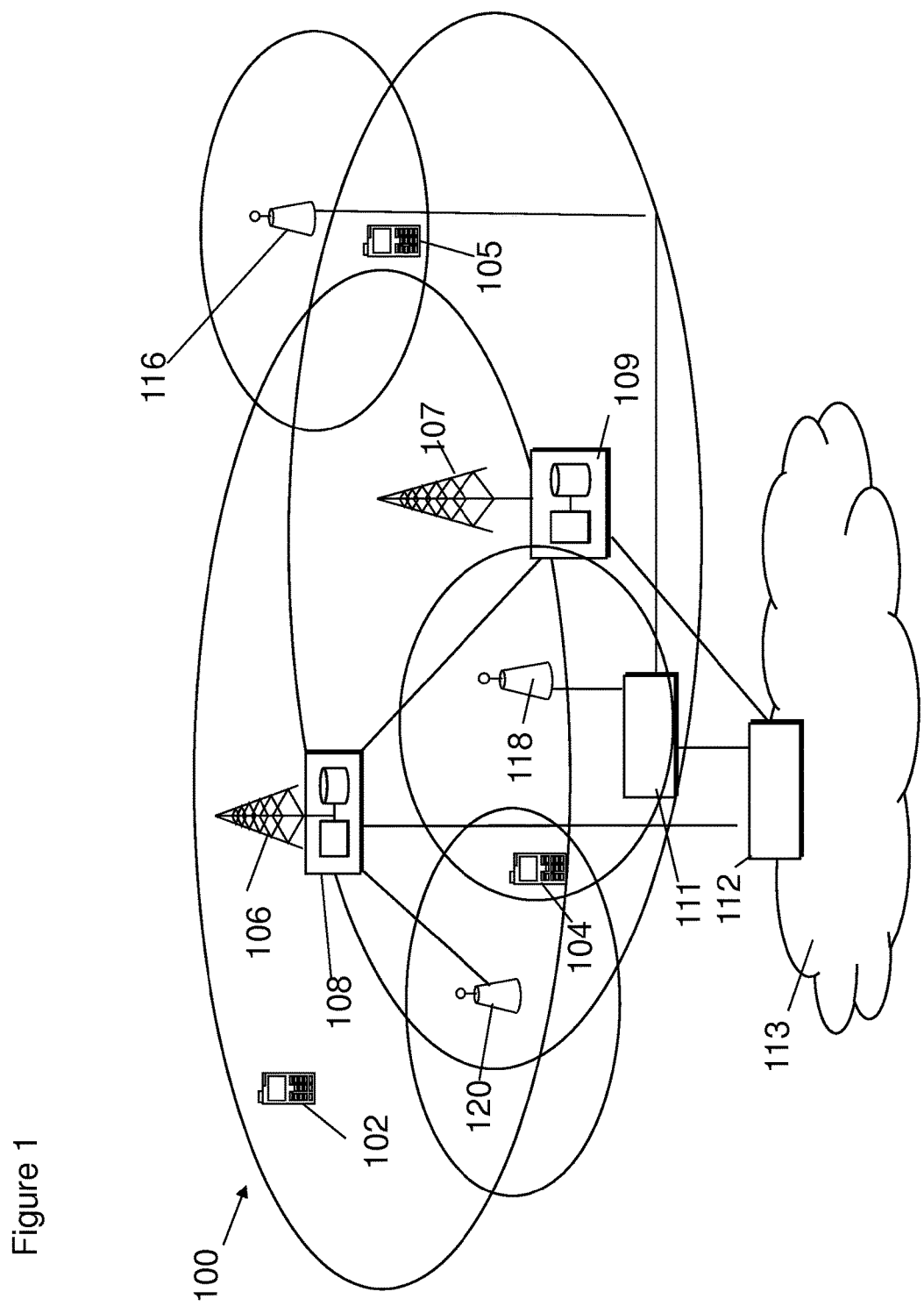
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
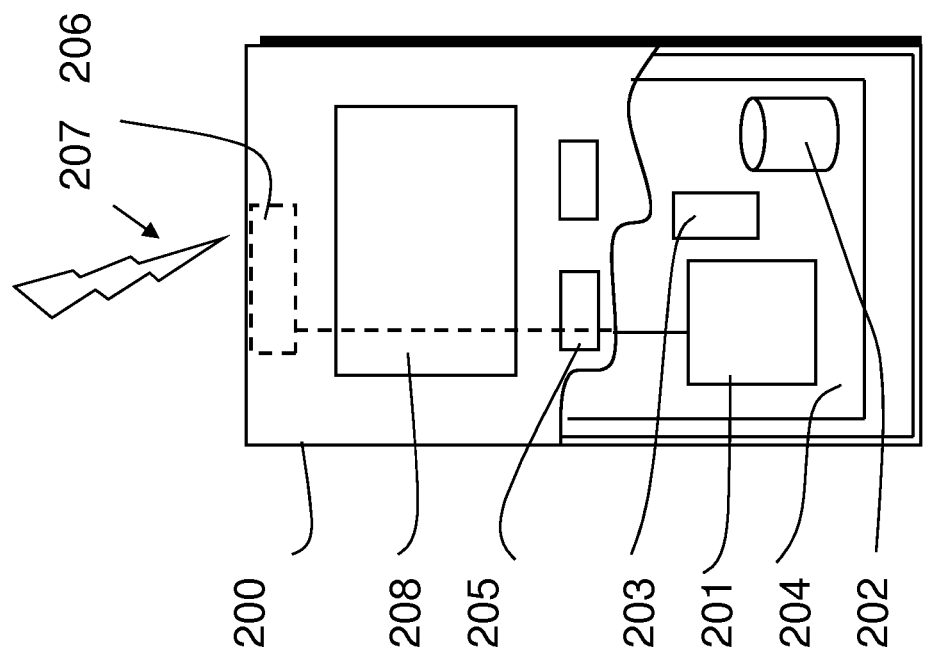
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Dual connectivity is a mode of operation of a UE in connected, e.g. RRC_CONNECTED, mode. The UE is configured with a master cell group (MCG) and a secondary cell group (SCG).

Figure 3:
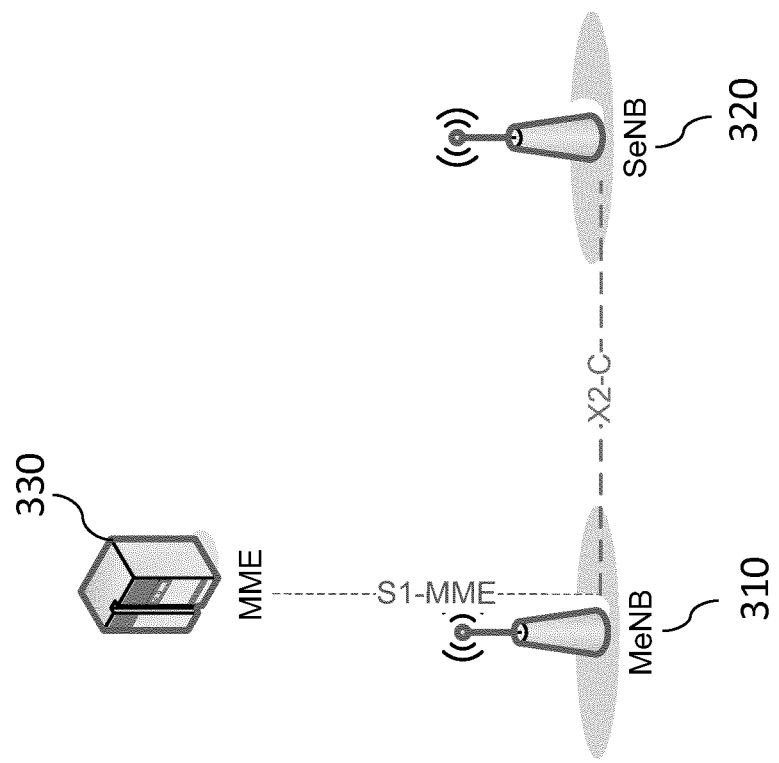
FIG. 3 shows a schematic diagram of C-Plane connectivity of eNBs involved in dual connectivity.

FIG. 3 shows a schematic diagram of C-Plane connectivity of eNBs 310 and 320 involved in dual connectivity. The interface between the MeNB 310 and the MME 330 is S1-MME. The interface between the MeNB 310 and the SeNB 320 is X2-C.

Figure 4:
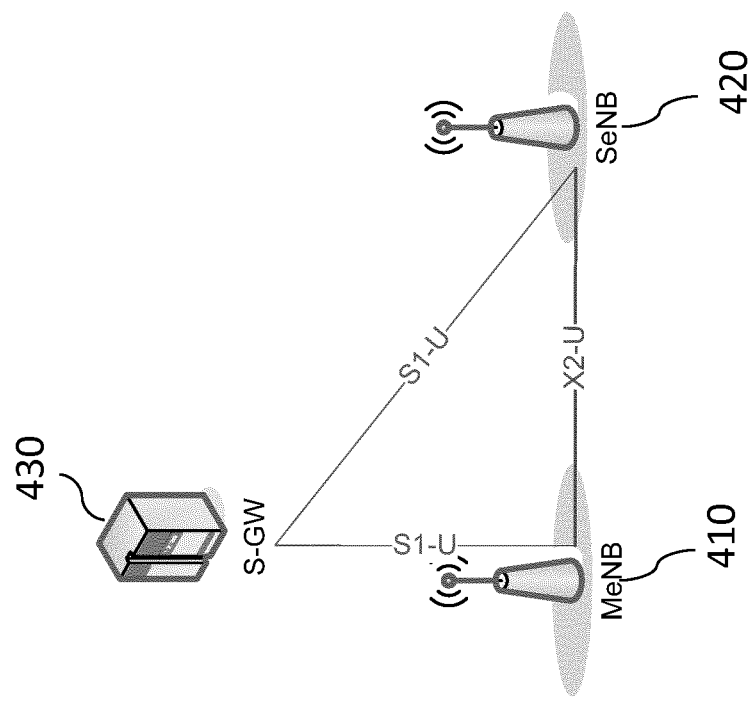
FIG. 4 shows a schematic diagram of U-plane connectivity of eNBs involved in dual connectivity.

FIG. 4 shows a schematic diagram of U-plane connectivity of eNBs 410 and 420 involved in dual connectivity. The interface between the MeNB 410 and the S-GW 430, and between the SeNB 420 and the S-GW 430 is S1-U. The interface between the MeNB 410 and the SeNB 420 is X2-U.

In dual connectivity, there are three types of bearers. MCG bearers, split bearers and SCG bearers. For MCG bearers, the MeNB is U-plane connected to the S-GW via S1-U, the SeNB is not involved in the transport of user plane data. For split bearers, the MeNB is U-plane connected to the S-GW via S1-U and the MeNB and the SeNB are interconnected via X2-U. For SCG bearers, the SeNB is directly connected with the S-GW via S1-U.

In the case of MeNB handover, i.e. the MeNB changes from the current one to a new one, while a SeNB does not, the SeNB may not be able to map the old session with the new session, since mapping information relating to a UE (that was active in the old session) is unavailable.

Figure 5:
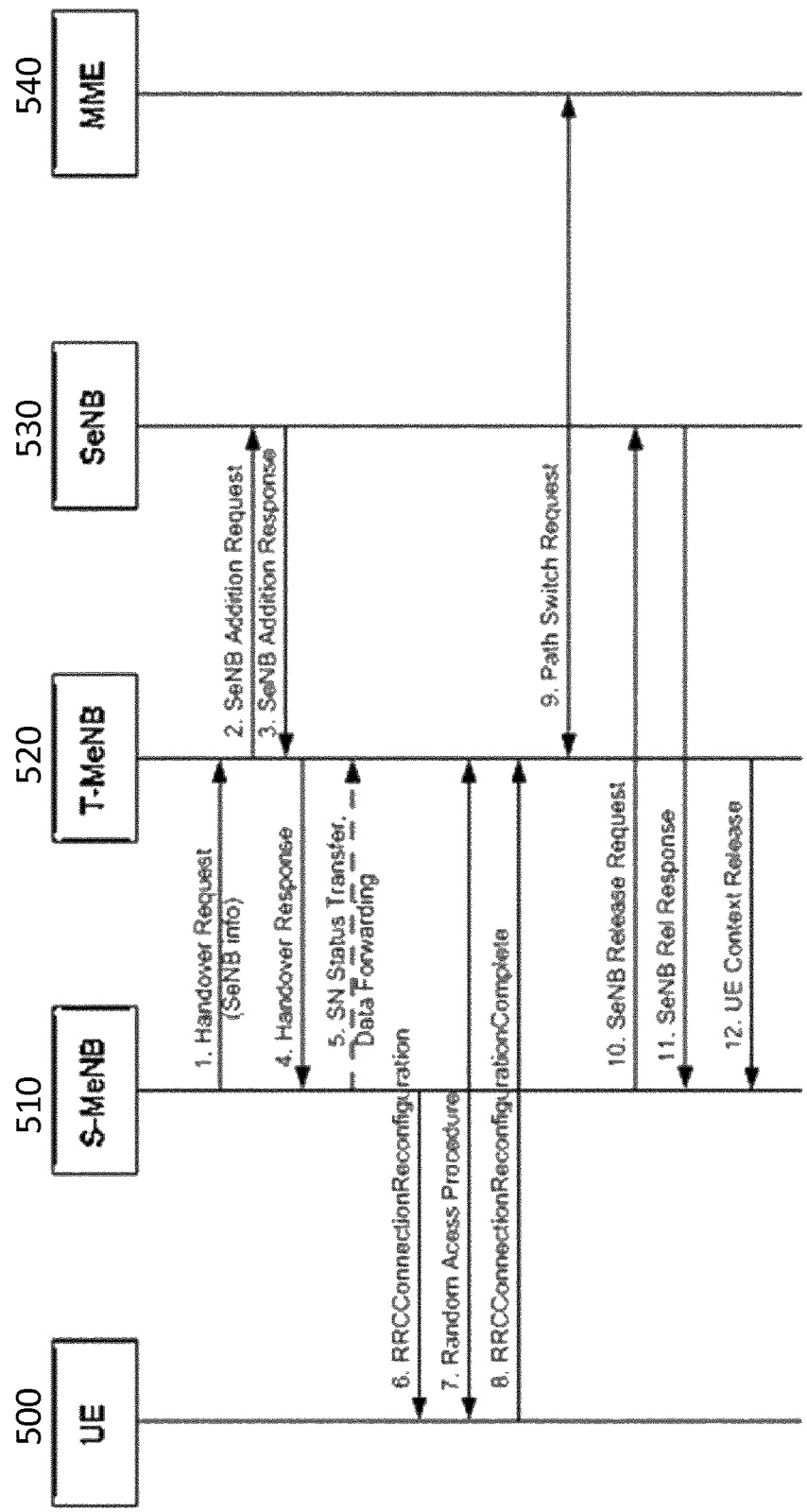
FIG. 5 shows an example signalling diagram of inter-MeNB handover.

An example signalling procedure for inter-MeNB handover retaining SeNB connectivity is shown in FIG. 5. X2 handover or S1 handover takes place to relocate the MeNB function towards the target MeNB.

In step 1 of the procedure shown in FIG. 5, a Handover Request message carries SeNB context information from the Source MeNB (S-MeNB) 510 to a target MeNB (T-MeNB) 520. SeNB context information may comprise any information that would be needed to transfer SeNB information, as available at the S-MeNB 510, to the T-MeNB 520). It is also possible to use S1 based handover signalling messages via MME 540 to carry this SeNB context information.

The SeNB Addition procedure at steps 2 and 3 establishes the X2 signalling connection between the T-MeNB 520 and SeNB 530. In case SeNB bearers are configured with the direct S1-U bearer option, a new security context would need to be established, as security material should be derived from the T-MeNB 520.

Data forwarding addresses may be exchanged in steps 1 and 4, in which case data forwarding could start at step 5, exact timing is implementation specific as for X2 handover.

At step 10, the S-MeNB 510 releases the signalling connection towards the SeNB 530.

At step 12, the T-MeNB 520 releases the X2 signalling connection towards the S-MeNB 510, as for any normal X2 HO.

However, it is not possible for SeNB 530 to map the old session and new session in this method because there is nothing to identify the UE 500 in the SeNB 530 after the handover takes place.

Figure 6A:
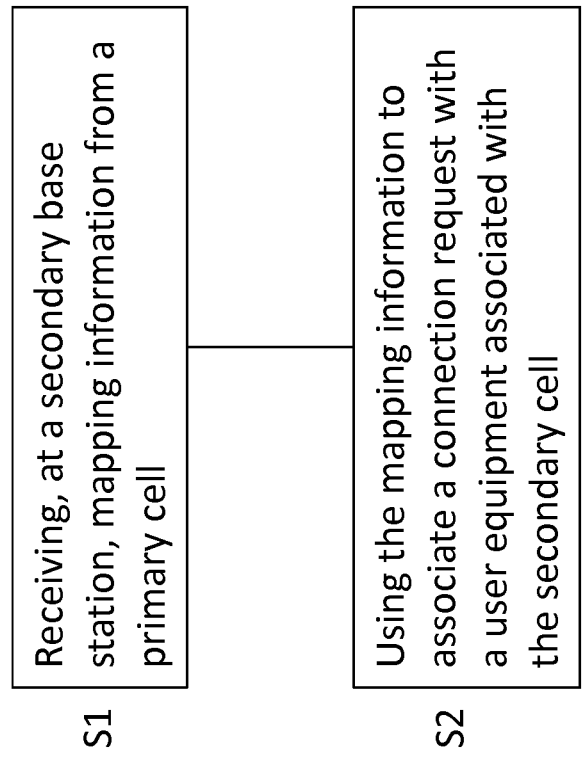
FIG. 6a shows a flowchart of an example method of a mapping mechanism in MeNB handover.

FIG. 6a shows a flowchart of an example method of inter-MeNB handover retaining SeNB connectivity. The method comprises, in a first step S1, receiving, at a secondary cell, mapping information from a primary cell and, in a second step S2, using the mapping information to associate a connection request with a user equipment associated with the secondary cell. Mapping information may be received at the primary cell from a source primary cell as part of a handover procedure from the source primary cell. The method may be performed at a base station which controls the secondary cell, for example at a secondary base station.

Figure 6B:
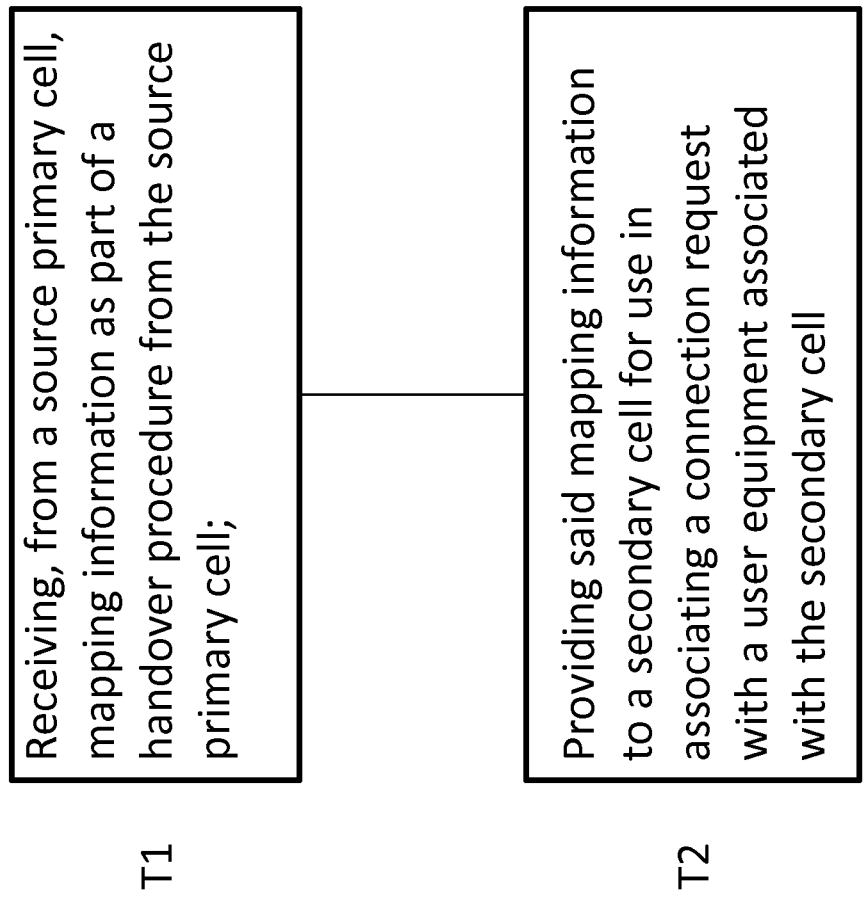
FIG. 6b shows a flowchart of an example method of a mapping mechanism in MeNB handover.

FIG. 6b shows a flowchart of an example method of inter-MeNB handover retaining SeNB connectivity. The method comprises in a first step T1, receiving, from a source primary cell, mapping information as part of a handover procedure from the source primary cell and, in a second step T2, providing said mapping information to a secondary cell for use in associating a connection request with a user equipment associated with the secondary cell. The method may be performed at a base station, for example a primary base station.

FIG. 6c shows a flowchart of an example method of inter-MeNB handover retaining SeNB connectivity. The method comprises, at step R1, providing, to a target primary cell, mapping information as part of a handover procedure to the target cell. The method may be performed at a base station, for example a primary base station.

Mapping information may be caused to be sent from a base station which controls a respective cell. Receiving said mapping information may comprise receiving said mapping information at a base station which controls a respective cell.

The primary and secondary cells may be controlled by the same base station or different base stations. The secondary cell may be controlled by a secondary base station, for example, a SeNB. The primary cells may be controlled by a primary base station, such as a MeNB. The primary cell in the method shown in FIG. 6a, may be a target primary cell and may be controlled by a base station, e.g. a T-MeNB. The source primary cell may be controlled by a base station, e.g. an S-MeNB.

The mapping information may comprise user equipment identity information such as, for example, secondary cell group E-UTRAN cell global identifier (SCG-ECGI) and secondary cell group cell radio network temporary identifier (SCG-C-RNTI). Alternatively, or in addition, the mapping information may comprise special secondary cell physical cell identity (PSCell PCI). Alternatively, or in addition, the mapping information may comprise X2 application protocol identity (APID) and control plane (CP) address.

The user equipment associated with the secondary cell may be a user equipment in dual connectivity mode that had an ongoing session with the secondary cell prior to the handover procedure between the source primary cell and the target primary cell.

In one embodiment, an S-MeNB sends SCG-ECGI and SCG-C-RNTI to target MeNB. The mapping information may be sent to the secondary cell in an addition request message. The T-MeNB sends SeNB an addition request message which in this example, contains the SCG-C-RNTI and SCG-ECGI provided by S-MeNB.

The SeNB, may then map the old UE context and new session request based on the mapping information, and keeps the same session.

Figure 7:
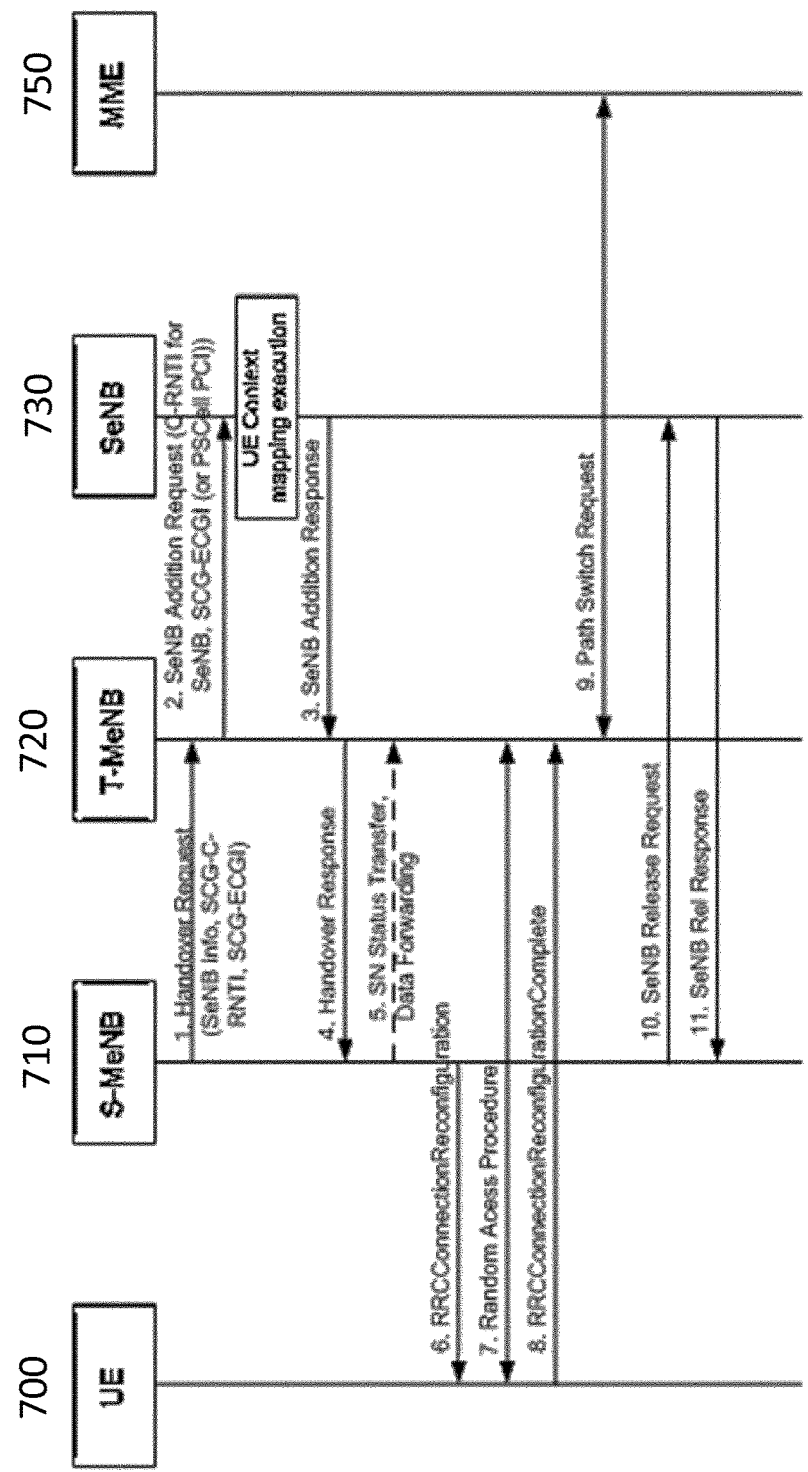
FIG. 7 shows an example signalling diagram of inter-MeNB handover.

FIG. 7 shows an example signalling procedure of a handover procedure in one embodiment in which a Handover Request message in step 1 carries SeNB context information. Context information may be any information that would be needed to transfer SeNB information as available at the S-MeNB 710 to the T-MeNB 720. In addition, S-MeNB 710 provides SCG-C-RNTI and SCG-ECGI to T-MeNB 720 in the handover request message. It is also possible to use S1 based handover signalling messages via MME 750 to carry this SeNB context information.

In step 2, T-MeNB 720 provides SCG-C-RNTI and SCG-ECGI in an addition request message to the SeNB 730. The SeNB 730 then executes mapping the old session and new session. Instead of SCG-ECGI, T-MeNB 720 may provide PSCell PCI to SeNB 730. In step 2, the information such as UE security capability, AS security Information, UE AMBR, handover restriction list may be omitted from the addition request message because they are already available in the SeNB 730. Steps 3 to 11 are as in FIG. 5.

In one embodiment, the mapping information may comprise SeNB X2 APID and SeNB CP address. An S-MeNB 710 sends the SeNB X2 APID and SeNB CP address to T-MeNB 720. The T-MeNB 720 sends SeNB modification request message using old APID (assigned by S-MeNB) and CP address of SeNB provided by S-MeNB 710. SeNB 730 maps the old UE context and new session request based on the old APID, and keeps the same session.

Figure 8:
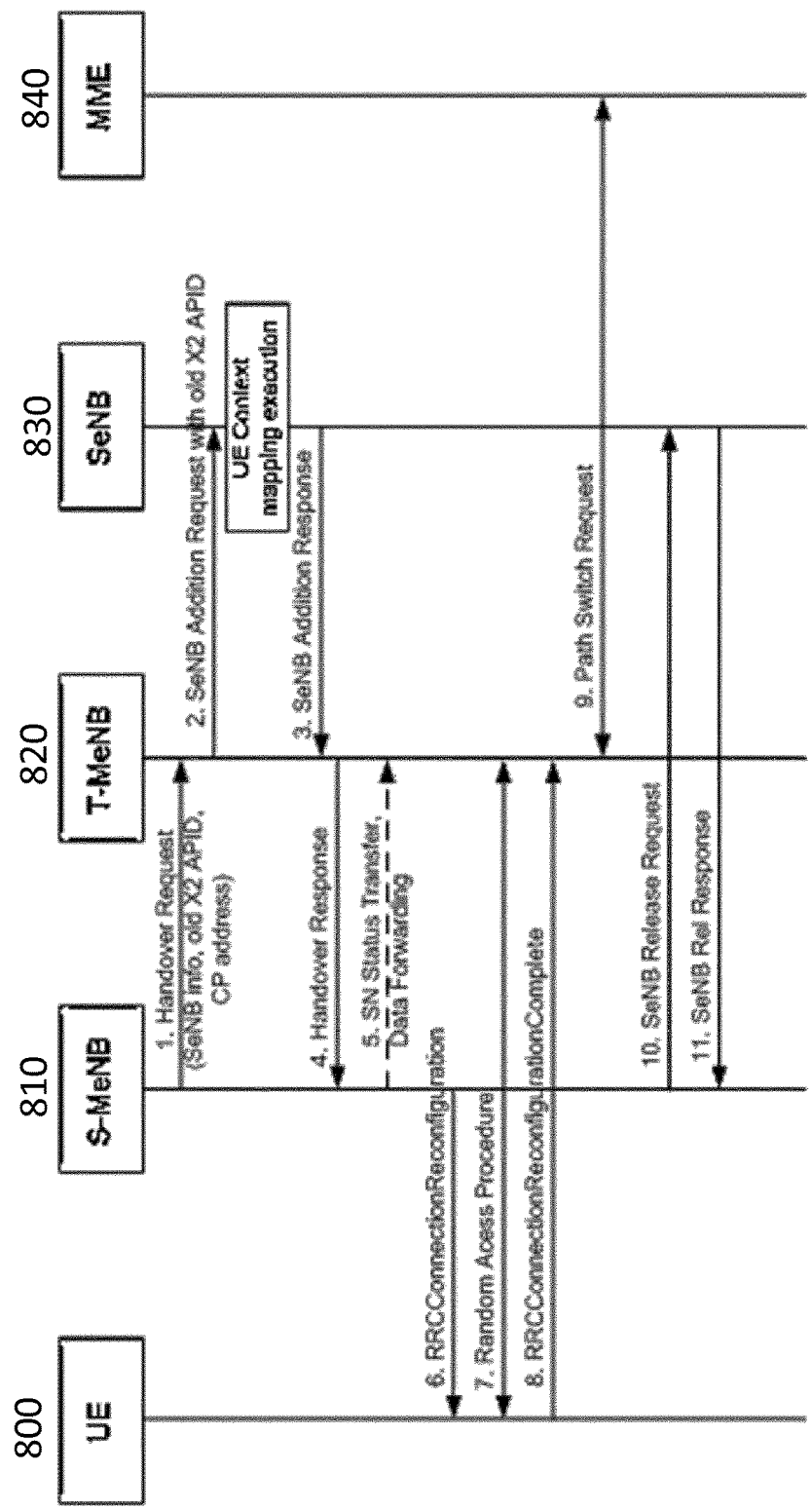
FIG. 8 shows an example signalling diagram of inter-MeNB handover.

FIG. 8 shows a signalling procedure in accordance with an embodiment in which the Handover Request message from S-MeNB 810 to T-MeNB 820 in step 1 provides the old X2 APID assigned by S-MeNB, and SeNB CP address to T-MeNB 820.

In step 2, T-MeNB 820 sends SeNB Addition Request with the old X2 APID to the SeNB 830 based on the provided CP address so that SeNB 830 can execute mapping the old session and new session.

In an alternative, instead of SeNB addition request and response messages (step 2 and step 3 of FIGS. 3, 6 and 7), SeNB modification request and response messages may be used. SeNB modification request may contain the secondary cell user equipment information, e.g. the old X2 APID, SCG-ECGI, SCG-C-RNTI information and/or PSCell PCI).

The above methods provide a mapping mechanism for session and node in the case of inter-MeNB handover. By supporting this mechanism, UE and SeNB can keep an ongoing session and may provide faster handover.

It should be understood that each block of the flowchart of FIGS. 6a, 6b and 6c and any combination thereof may be implemented by various means or their combinations, such as hardware, software, firmware, one or more processors and/or circuitry.

Figure 9:
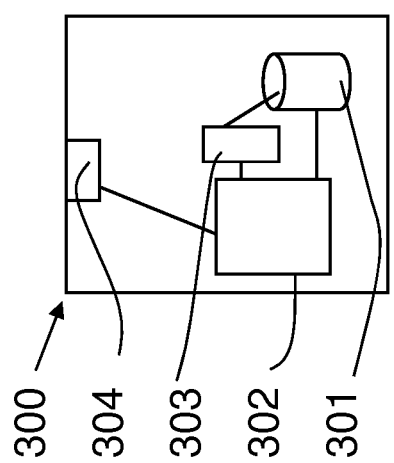
FIG. 9 shows an example control apparatus.

Embodiments described above by means of FIGS. 1 to 8 may be implemented on a control apparatus as shown in FIG. 9 or on a mobile device such as that of FIG. 2. FIG. 9 shows an example of a control apparatus for a communication system, for example to be coupled to and/or for controlling a station of an access system, such as a base station or (e) node B, or a server or host. In some embodiments, base stations comprise a separate apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may include at least receiving, at a secondary cell, mapping information from a primary cell and using the mapping information to associate a connection request with a user equipment associated with the secondary cell. Alternatively, or in addition, control functions may include receiving, from a source primary cell, mapping information as part of a handover procedure from the source primary cell and providing said mapping information to a secondary cell for use in associating a connection request with a user equipment associated with the secondary cell. Alternatively or in addition, control functions may include at least providing, to a target primary cell, mapping information as part of a handover procedure to the target cell.

Figure 10:
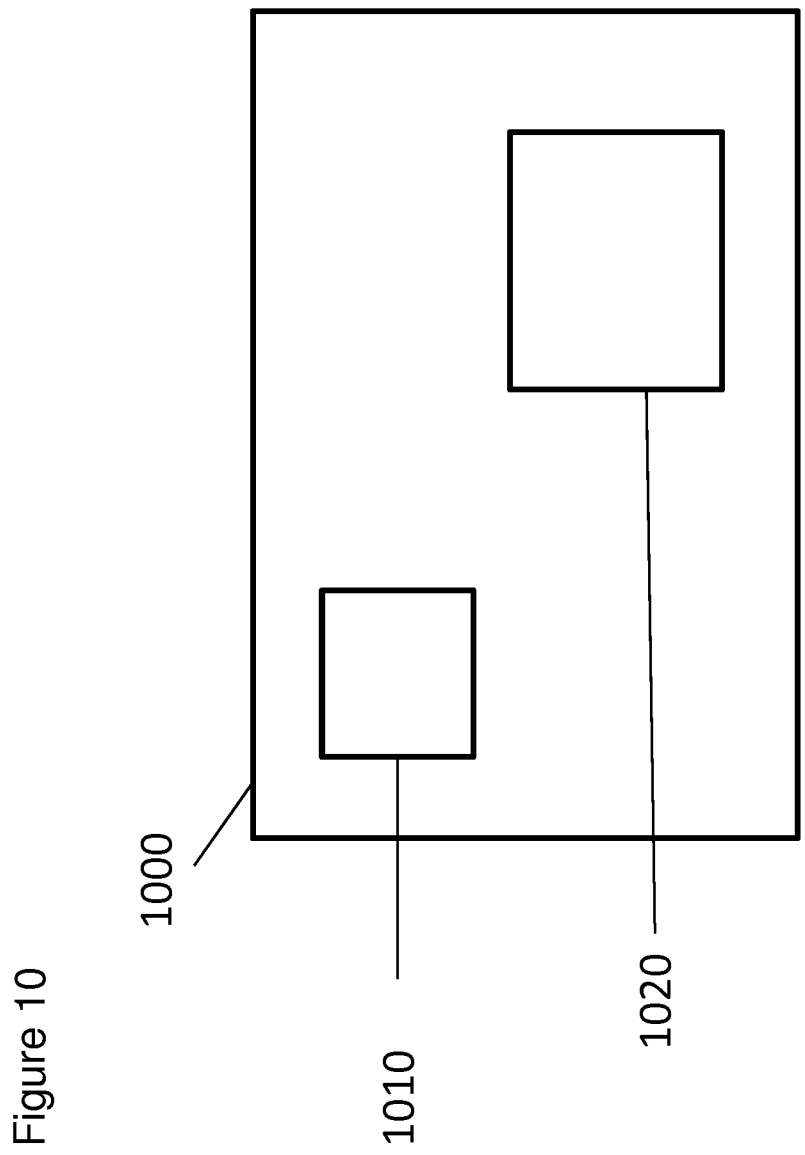
FIG. 10 shows a schematic diagram of an example apparatus.

An example of an apparatus 1000 is shown in FIG. 10 and comprises means 1010 for receiving, at a secondary cell, mapping information from a primary cell and means 1020 for using the mapping information to associate a connection request with a user equipment associated with the secondary cell.

Figure 11:
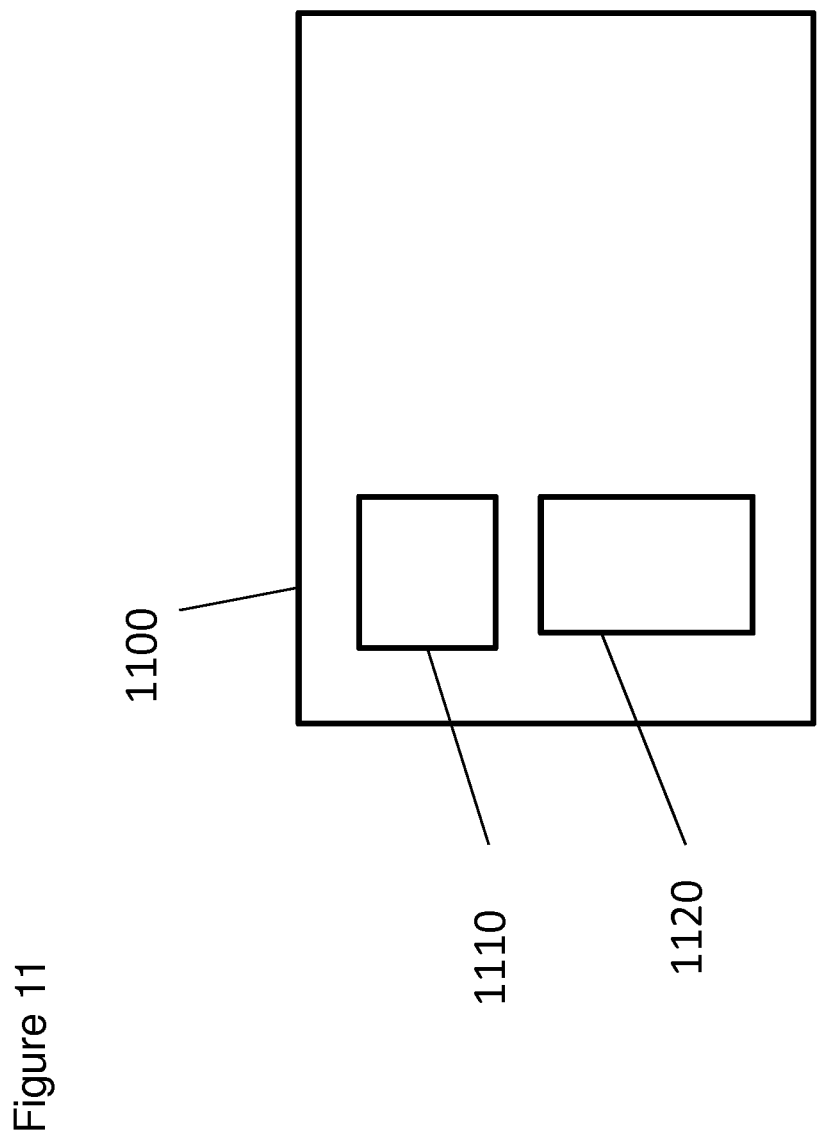
FIG. 11 shows a schematic diagram of an example apparatus.

An example of an apparatus 1100 is shown in FIG. 11 and comprises means 1110 for receiving, from a source primary cell, mapping information as part of a handover procedure from the source primary cell and means 1120 for providing said mapping information to a secondary cell for use in associating a connection request with a user equipment associated with the secondary cell.

Figure 12:
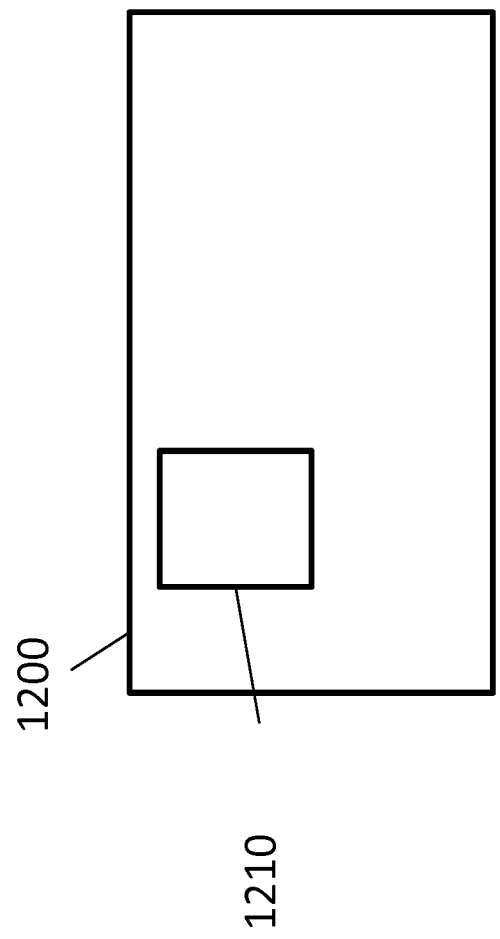
FIG. 12 shows a schematic diagram of an example apparatus

An example of an apparatus 1200 is shown in FIG. 12 and comprises means 1210 for providing, to a target primary cell, mapping information as part of a handover procedure to the target cell It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 8 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 8 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
receiving, at a secondary cell, mapping information from a target primary cell;
using the mapping information to associate a connection request with a user equipment associated with the secondary cell,
wherein said mapping information comprises user equipment identity information;
wherein said user equipment identity information comprises a cell radio network temporary identifier and at least one of an E-UTRAN cell global identifier and a physical cell identity; and
wherein the connection request is part of a handover procedure of the user equipment to the target primary cell from a source primary cell; and
using the connection request associated with the user equipment to keep an ongoing session between the secondary cell and the user equipment.

2. A method according to claim 1, comprising: receiving said mapping information in one of a secondary node addition request message and a secondary node modification request message.

3. A method according to claim 1, comprising performing said method at a base station which controls the secondary cell.

4. A method comprising:
receiving, at a target primary cell and from a source primary cell, mapping information as part of a handover procedure of a user equipment from the source primary cell to the target primary cell; and
providing by said target cell said mapping information to a secondary cell for use in associating a connection request with a user equipment associated with the secondary cell in order for the secondary cell to keep an ongoing session between the secondary cell and the user equipment,
wherein said mapping information comprises user equipment identity information;
wherein said user equipment identity information comprises a cell radio network temporary identifier and at least one of an E-UTRAN cell global identifier and a physical cell identity; and
wherein the connection request is part of the handover procedure of the user equipment to the target primary cell from the source primary cell.

5. A method according to claim 4, comprising providing application protocol identity to the secondary cell in dependence on a received control plane address.

6. A method according to claim 4, comprising providing said mapping information in one of a secondary node addition request message and a secondary node modification request message.

7. A method comprising:
performing at a source primary cell a handover procedure to handover a user equipment from the source primary cell to a target primary cell, the handover procedure comprising:
providing, to the target primary cell, mapping information as part of the handover procedure,
wherein said mapping information comprises user equipment identity information for a user equipment associated with a secondary cell;
wherein said user equipment identity information comprises at least one of an E-UTRAN cell global identifier, a cell radio network temporary identifier, an application protocol identity, a physical cell identity and a control plane address; and
wherein the user equipment identity information is for use by the target primary cell for sending to a secondary cell to allow the secondary cell to map the equipment identity information with the user equipment associated with the secondary cell in order for the secondary cell to keep an ongoing session between the secondary cell and the user equipment.

8. An apparatus, said apparatus comprising:
at least one processor;
and at least one memory including computer program code;
the at least one memory and the computer program code configured to, with the at least one processor, cause the apparatus at least to:
receive, at a secondary cell, mapping information from a target primary cell;
use the mapping information to associate a connection request with a user equipment associated with the secondary cell,
wherein said mapping information comprises user equipment identity information;
wherein said user equipment identity information comprises a cell radio network temporary identifier and at least one of an E-UTRAN cell global identifier and a physical cell identity; and
wherein the connection request is part of a handover procedure of the user equipment to the target primary cell from a source primary cell; and
using the connection request associated with the user equipment to keep an ongoing session between the secondary cell and the user equipment.

9. An apparatus, said apparatus comprising:
at least one processor; and at least one memory including computer program code;
the at least one memory and the computer program code configured to, with the at least one processor, cause the apparatus at least to:
receive, at a target primary cell and from a source primary cell, mapping information as part of a handover procedure of a user equipment from the source primary cell to the target primary cell; and
provide by said target cell said mapping information to a secondary cell for use in associating a connection request with a user equipment associated with the secondary cell in order for the secondary cell to keep an ongoing session between the secondary cell and the user equipment, wherein said mapping information comprises user equipment identity information;

wherein said user equipment identity information comprises the cell radio network temporary identifier and at least one of an E-UTRAN cell global identifier and a physical cell identity; and wherein the connection request is part of the handover procedure of the user equipment to the target primary cell from the source primary cell.

10. An apparatus, said apparatus comprising:

at least one processor; and at least one memory including computer program code;

the at least one memory and the computer program code configured to, with the at least one processor, cause the apparatus at least to:

performing at a source primary cell a handover procedure to handover a user equipment from the source primary cell to a target primary cell, the handover procedure comprising:

provide, to the target primary cell, mapping information as part of the handover procedure, wherein said mapping information comprises user equipment identity information;

wherein said user equipment identity information comprises the cell radio network temporary identifier and at least one of an E-UTRAN cell global identifier and a physical cell identity; and wherein the user equipment identity information is for use by the target primary cell for sending to a secondary cell to allow the secondary cell to map the equipment identity information with the user equipment associated with the secondary cell in order for the secondary cell to keep an ongoing session between the secondary cell and the user equipment.

* * * * *